(12) United States Patent
Legagneur et al.

(10) Patent No.: US 8,498,456 B2
(45) Date of Patent: Jul. 30, 2013

(54) METHOD AND SYSTEM FOR APPLYING COSMETIC AND/OR ACCESSORIAL ENHANCEMENTS TO DIGITAL IMAGES

(75) Inventors: Pierre Legagneur, Baldwin, NY (US); Shiju P. Abraham, Jersey City, NJ (US); Matthew Gearhart, Irving, TX (US); Aleksey Shapiro, Brooklyn, NY (US); Tyler Larson, New York, NY (US); Csaba Pankaczy, Toronto (CA); Alvin Chan, North York (CA)

(73) Assignee: Stylecaster, Inc., Wilmington, DE (US)

( * ) Notice: Subject to any disclaimer, the term of this patent is extended or adjusted under 35 U.S.C. 154(b) by 470 days.

(21) Appl. No.: 12/835,167

(22) Filed: Jul. 13, 2010

(65) Prior Publication Data
US 2011/0164787 A1 Jul. 7, 2011

Related U.S. Application Data

(60) Provisional application No. 61/225,052, filed on Jul. 13, 2009.

(51) Int. Cl.
*G06K 9/00* (2006.01)
(52) U.S. Cl.
USPC .......................................................... 382/118
(58) Field of Classification Search
None
See application file for complete search history.

(56) References Cited

U.S. PATENT DOCUMENTS

| | | | | | |
|---|---|---|---|---|---|
| 6,091,836 | A | * | 7/2000 | Takano et al. | 382/118 |
| 6,141,431 | A | * | 10/2000 | Munetsugu et al. | 382/100 |
| 6,571,003 | B1 | * | 5/2003 | Hillebrand et al. | 382/118 |
| 7,559,032 | B2 | * | 7/2009 | King et al. | 715/763 |
| 8,055,067 | B2 | * | 11/2011 | Petrescu et al. | 382/164 |
| 8,205,161 | B2 | * | 6/2012 | King et al. | 715/763 |
| 8,245,188 | B2 | * | 8/2012 | Hertenstein | 717/114 |
| 8,345,114 | B2 | * | 1/2013 | Ciuc et al. | 348/222.1 |
| 2004/0110113 | A1 | * | 6/2004 | Huang et al. | 434/100 |
| 2004/0170337 | A1 | * | 9/2004 | Simon et al. | 382/254 |
| 2004/0218810 | A1 | * | 11/2004 | Momma | 382/162 |
| 2006/0153470 | A1 | * | 7/2006 | Simon et al. | 382/254 |
| 2006/0228037 | A1 | * | 10/2006 | Simon et al. | 382/254 |
| 2007/0258656 | A1 | * | 11/2007 | Aarabi | 382/254 |
| 2008/0016491 | A1 | * | 1/2008 | Doepke | 717/104 |
| 2009/0231356 | A1 | * | 9/2009 | Barnes et al. | 345/594 |

* cited by examiner

*Primary Examiner* — Samir Ahmed
(74) *Attorney, Agent, or Firm* — Goodwin Procter LLP

(57) ABSTRACT

A method for a creating a virtual makeover includes inputting an initial digital Image into and initiating a virtual makeover at a local processor. Instructions are transmitted from the main server to the local processor. Positions of facial features are isolated within the digital image at the local processor. Facial regions within the digital image are defined based on the positions of the facial features at the local processor. After receiving input, cosmetic enhancements or the accessorial enhancement are applied to the digital image at the local processor. A final digital image is generated including the enhancements. The final digital image is then displayed. At least the defining, applying, and generating steps include instructions written in a non-flash format for execution in a flash-based wrapper.

16 Claims, 15 Drawing Sheets

METHOD AND SYSTEM FOR APPLYING COSMETIC AND/OR ACCESSORIAL ENHANCEMENTS TO DIGITAL IMAGES

CROSS-REFERENCE TO RELATED APPLICATION(S)

This application claims the benefit of U.S. Provisional Patent Application Ser. No. 61/225,052, filed on Jul. 13, 2009, the disclosure of which is incorporated by reference herein in its entirety.

FIELD OF THE INVENTION

The present invention is directed, generally, to a method for applying cosmetic and/or accessorial enhancements to one or more digital images. In common parlance, the present invention is directed to a method for creating a virtual makeover for a user. The present invention may be embodied in software that is executable by one or more processors.

DESCRIPTION OF THE RELATED ART

In the fashion and cosmetic industry, it is commonplace to encourage consumers to try on new fashions and cosmetics, ultimately with the goal of selling products to those consumers.

With respect to cosmetics, the traditional approach has been for a customer to apply cosmetics, usually at the point of sale for the cosmetics (e.g., at a department or specialty store). The application of cosmetics at the point of sale is referred to herein as an "actual makeover."

The same approach has been applied traditionally with respect to accessories, including headwear (e.g., hats, glasses, and sunglasses) and jewelry (e.g., earrings and necklaces). This same approach is encompassed by the term "actual makeover."

While actual makeovers provide an effective sales methodology, there are drawbacks.

For example, after a consumer has applied a particular cosmetic regimen, the consumer is effectively prohibited from applying a completely different combination of cosmetics. Once the first regimen of cosmetics has been applied, the consumer must remove that first regimen before applying a subsequent regimen. In most sales environments, this is not convenient or feasible.

In addition, the application of a cosmetic regimen can be time consuming. As a result, certain consumers avoid trying on cosmetics at the point of sale, simply because they do not have the time to engage in an actual makeover.

Still further, some consumers shy away from actual makeovers, preferring to apply cosmetics without assistance from professionals. In other words, there are consumers who prefer to select cosmetics based on their own research, rather than relying on advice or assistance from salespersons, professionals, etc.

The Internet has provided product marketers with a plethora of advantageous points of sale to consumers.

Despite all of the advantages provided by the Internet for product marketers, the initial sale of cosmetics has not been enhanced through Internet-based points of sale to the same degree as other product types.

The sale of cosmetics over the Internet, especially the initial sale, tends to be hampered because consumers desire to see the product in person or to apply the product before making an initial purchase.

As with other products, once the consumer makes an initial purchase of a particular cosmetic, repeat sales (i.e., secondary sales) of the same cosmetic is greatly enhanced through the Internet.

As noted above, the sales of accessories via the Internet also has been hindered for similar reasons.

As suggested by the foregoing, the initial sale of cosmetics and/or accessories presents a challenge to product marketers.

This challenge has generated a need in the cosmetic and/or accessory industries for unique marketing tools.

SUMMARY OF THE INVENTION

While the present invention is discussed primarily in connection with cosmetics, it should be understood that the discussion applies equally to accessories.

The present invention provides a system and method through which consumers may "try on" cosmetics and/or accessories in a virtual environment, permitting consumers to select particular products without having to physically handle the products.

The present invention provides a method, which is executable by software, whereby a consumer may modify a personal digital image to garner an appreciation of how a particular cosmetic and/or accessory might appear when actually applied to the consumer.

The present invention, in general, provides a method whereby a consumer may undergo a "virtual makeover."

The present invention encompasses a method for a creating a virtual makeover, executable by one or more processors. The method includes the steps of connecting a local processor to a main server and inputting an initial digital image into the local processor. The virtual makeover is initiated at the local processor whereupon instructions from the main server are transmitted to the local processor. Then positions of facial features are isolated within the digital image at the local processor and facial regions within the digital image are defined based on the positions of the facial features at the local processor. Input is received at the local processor concerning selected ones of cosmetic enhancements or accessorial enhancements to be applied to the initial digital image. As a result, the cosmetic enhancements or the accessorial enhancement are applied to the digital image at the local processor. Then, a final digital image is generated that includes the initial digital image as enhanced by application of the cosmetic enhancements or the accessorial enhancements. Finally, the final digital image is displayed. In the method, at least one of the defining, applying, and generating steps include instructions written in a non-flash format for execution in a flash-based wrapper.

In one contemplated embodiment of the method, the non-flash format comprises at least HTML-based code.

In another contemplated embodiment, the non-flash format comprises at least HTML-based and CSS-based code.

In still another contemplated embodiment, the flash-based wrapper is executed within an Internet browser.

In the method of the present invention, it is contemplated that the local processor and the main server are connected via the Internet.

In one further contemplated embodiment, the method includes isolating positions of hair features within the digital image at the local processor.

In an additional contemplated embodiment, the method includes receiving input to adjust the facial features isolated within the digital image.

The method also may include receiving input to adjust the hair features isolated within the digital image.

The cosmetic enhancements may be at least one of foundation, blush, eyeshadow, lipstick, and mascara.

Furthermore, the cosmetic enhancements may encompass at least one of transparency, shimmer, gloss, and matte.

The accessorial enhancements are at least one of earrings, necklaces, tiaras, hats, glasses, sunglasses, contact lenses, hair clips, barrettes, flowers, clips, veils, and jewelry.

In another contemplated embodiment of the invention, at least one of the isolating, defining, applying, and generating steps are performed at the local processor and at the main server.

The present invention also contemplates that the local processor comprises a plurality of local processors.

Still further, the present invention contemplates that the main server includes at least one database and at least one server-side application.

The local processor is anticipated to encompass at least a browser and a wrapper.

Other advantages of the present invention will be made apparent from the discussion that follows.

BRIEF DESCRIPTION OF THE DRAWINGS

The present invention is described In connection with one or more illustrations in which.

DETAILED DESCRIPTION OF EMBODIMENT(S) OF THE INVENTION

Figure 1:
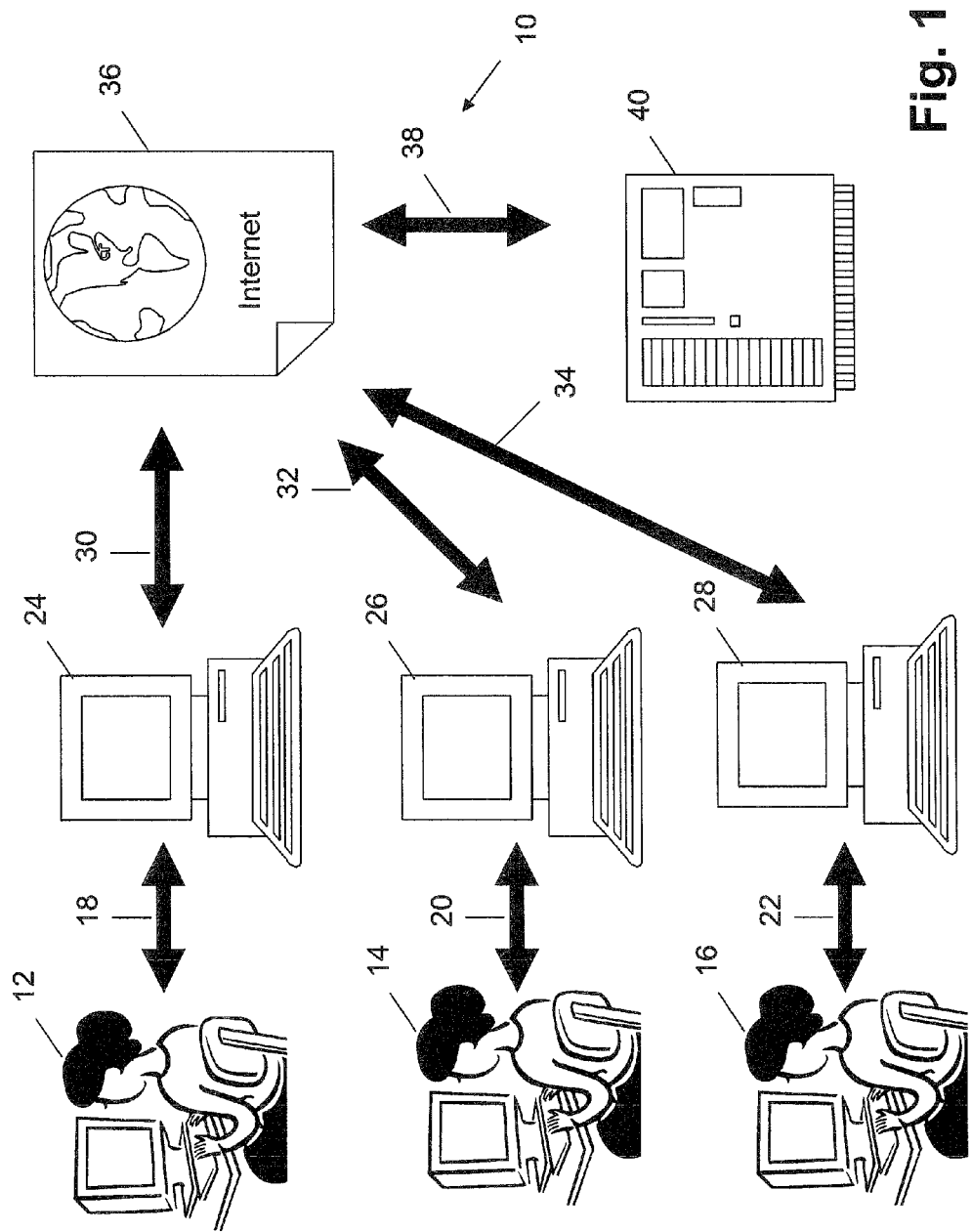
FIG. 1 is a schematic overview of the system contemplated by the present invention for a virtual makeover, as applied to a plurality of users.

The present invention will now be described in connection with one or more specific embodiments. The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the present invention.

The present invention provides a method by which a consumer may engage in a "virtual makeover" using a personal computer or the like.

A "virtual makeover" encompasses, but is not limited to, circumstances where a consumer inputs a digital image into an executable program (also referred to as software) and provides additional inputs to the executable program so that the digital image may be modified. The modifications are applied to the initial digital image (also referred to as the original digital image), thereby creating a final digital image including the modifications, which are also referred to as "enhancements" herein.

The present invention encompasses a large number of effects that may be applied to a digital image, as discussed in greater detail herein. In one contemplated example, if the consumer elects to "try on" a particular lipstick, the initial image is modified to include the selected lipstick and modify the original image to provide at least an approximation of how the selected lipstick will appear on the person depicted in the digital image. The effects applied to modify the initial digital image are referred to herein as "cosmetic enhancements."

While the present invention may be discussed in connection with the application of particular cosmetic effects to a digital image, the present invention is not intended to be limited solely to cosmetic effects. It is contemplated that a consumer may try on various accessories including, but not limited to, earrings, necklaces, tiaras, hats, glasses, sunglasses, contact lenses, hair clips (barrettes, flowers, clips), veils, etc. As with a cosmetic enhancement, the original digital image may be modified to include one or more accessories either alone or in combination with specific cosmetic effects. These effects are referred to herein as "accessorial enhancements" to distinguish them from "cosmetic enhancements."

As will become apparent from the discussion that follows, the terms "accessorial enhancements" and "cosmetic enhancements" may be used interchangeably. Accordingly, the term "enhancement," as used herein, is intended to encompass both types.

As an initial matter, it is noted that the present invention is discussed primarily in connection with static, digital images, i.e., digital photographs. The present invention, however, is not intended to be limited solely to static, digital images. The present invention may be applied to moving images, including digital video files. As a result, the present invention is intended to encompass enhancements that are applied both to static and dynamic images.

With respect to dynamic digital images, i.e., digital video files, the present invention may apply the enhancements to the digital images on a frame-by-frame basis. This is particularly applicable to instances where a digital video file is merely a collection of separate digital images taken over a predetermined time period (e.g., standard or nonstandard frame rates). In other instances, for example, where the digital video file incorporates one or more files that memorialize changes to an initial digital image, the present invention also may be applied.

FIG. 1 provides a general overview of the makeover system 10 encompassed by the present invention.

The term "makeover system" is intended to encompass the equipment and components that are required or desired to implement a virtual makeover. The term is not intended to refer to any one particular component or group of components. To the contrary, as detailed herein, and as should be apparent to those skilled in the art, there are numerous substitutions, variations, and equivalents that may be employed to assemble the makeover system 10 without departing from the scope of the invention.

The makeover system 10 is intended to encompass interaction with one or more users. In FIG. 1, three users 12, 14, 16 are illustrated. The three users 12, 14, 16, each provide input and receive output via communication links 18, 20, 22 between the users 12, 14, 16 and their respective computers 24, 26, 28. The communication links 18, 20, 22 encompass one or more input/output devices associated with the computers 24, 26, 28. Individual input devices may include, for example, a mouse, a keyboard, a memory unit, or the like. The output device may encompass, for example, a monitor or other suitable visual display device.

The computers 24, 26, 28 are connected, via communication links 30, 32, 34 to the Internet 34 and, thereby, to a main server 40. As should be appreciated by those skilled in the art, the communication links 30, 32, 34, 38 may be wired or wireless links. Wireless links encompass, but are not limited to, radio links, infrared links, optical links, Bluetooth® links, cellular links, satellite links, or the like.

The main server 40 may be a portal to direct traffic from the users 12, 14, 16 to a main processor. Alternatively, the main server 40 may include the main processor that provides functionality to the users 12, 14, 16. A particular configuration for the server 40 is not required to practice the present invention.

For purposes of the discussion that follows, reference is made to the main server 40 both as a portal and as a central processor. This is intended to encompass at least the two embodiments for the main server 40 that fall within the scope of the invention. This is also intended to encompass the variations and equivalents of the main server 40 that may be appreciated by those skilled in the art. It is noted that the server 40 may encompass additional, separate components as well. For example, the main server 40 may encompass an Internet router (or multiple routers), as required or desired. The main server 40 also may encompass one or more filters and/or firewalls, as should be understood by those skilled in the art.

The graphical icon of the main server 40 in FIG. 1 is intended to provide a generic representation of a device on which the executable program of the present invention resides, at least in part. As will become more apparent from the discussion that follows, the executable instructions may reside on the main server 40, an associated processor, and associated database, and/or one or more of the computers 24, 26, 28. Other configurations also are contemplated to fall within the scope of the invention, as should be appreciated by those skilled in the art.

With respect to the executable instructions, in cases where the instructions are executed with the assistance of multiple processors, several embodiments are contemplated to fall within the scope of the present invention. For example, the processors may be parallel processors that are associated with one or more separate devices. Alternatively, the processors may be connected to one another in a nodal fashion, each of which executes a portion of the executable instructions. Other variations also are possible and are intended to fall within the scope of the present invention.

With continued reference to FIG. 1, the system 10 may include as few as one user 12 or potentially millions of users. The same may be said of the computers 24, 26, 28. As for the server 40, several servers may be connected to the Internet 36 to handle the digital traffic from the users 12, 14, 16. The servers 40 may be connected to the Internet 36 via one or more routers (not shown), as should be understood by those skilled in the art.

In an alternative embodiment to the system 10 illustrated in FIG. 1, it is contemplated that additional communication links may be provided. For example, one or more of the computers 24, 26, 28 may be connected to one another in addition to the connection available through the Internet 36. This arrangement may be employed where each of the computers 24, 26, 28 interact with one another in a nodal capacity, as discussed above, and as should be appreciated by those skilled in the art.

The computers 24, 26, 28 that are illustrated in FIG. 1 are personal computers. The term "personal computer" is intended to encompass desktop computers, laptop computers, and their equivalents. It is contemplated, however, that any device with a processor may be substituted for the computers 24, 26, 28 without departing from the present invention. For example, the present invention could be executed via a personal data assistant ("PDA") or cell phone, among other electronic devices too numerous to list here.

As illustrated in FIG. 1, the communication links 18, 20, 22, 30, 32, 34, 28 are intended to be two-way communication links. It is contemplated that these communication links 18, 20, 22, 30, 32, 34, 28 may be replaced by multiple single-direction links, as should be appreciated by those skilled in the art.

Reference to any communication links herein is intended to refer to unidirectional links, bi-directional links, and other types of links that should be apparent to those skilled in the art. Moreover, specific reference to a particular genre of communication links (i.e., bi-directional links) is not intended to be limiting of the type of links that may be employed for use with the present invention.

Figure 2:
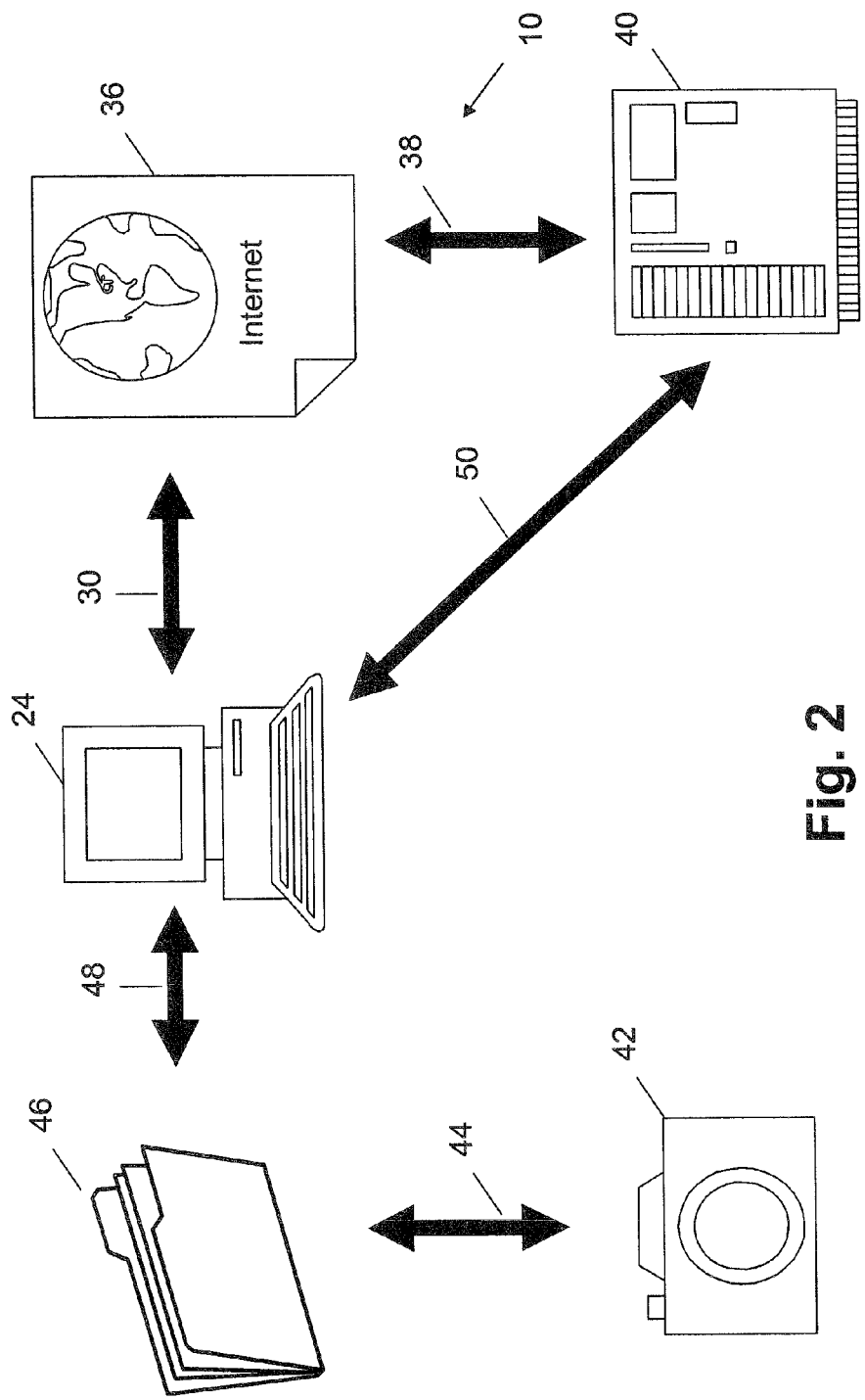
FIG. 2 is a schematic overview of the system contemplated by the present invention for a virtual makeover, as applied, in the context of an single user.

FIG. 2 provides a general schematic encompassing the system 10 as it pertains to one of the users 12, 14, 16.

The system 10 encompasses a camera 42 that captures and transmits, via a communication link 44, digital images 46. The digital images 46, in turn, are provided to the computer 24 via the communication link 48. It is noted that only a single communication link may be used instead of the two communication links 44, 48. A single communication link may be employed in cases where the camera 42 is incorporated into the computer 24, for example.

The remainder of the system 10 is the same as that depicted in FIG. 1, with one exception. Specifically, FIG. 2 illustrates a communication link 50 from the main server 40 to the computer 24 where the communication link 50 bypasses the Internet 36. This arrangement may be required in instances where the computer 24 dials into the server via a telephone connection, for example. It is expected, however, that the majority of communications will occur via the Internet 36.

The camera 42 may be independent of the computer 24 or may be incorporated into the computer 24. The location and type of the camera 42 is not intended to be limiting of the scope of the present invention. As should be apparent, it is anticipated that the camera 42 is a digital camera. However, a non-digital camera also may be employed in combination with one or more devices that convert non-digital images into digital images.

Figure 3:
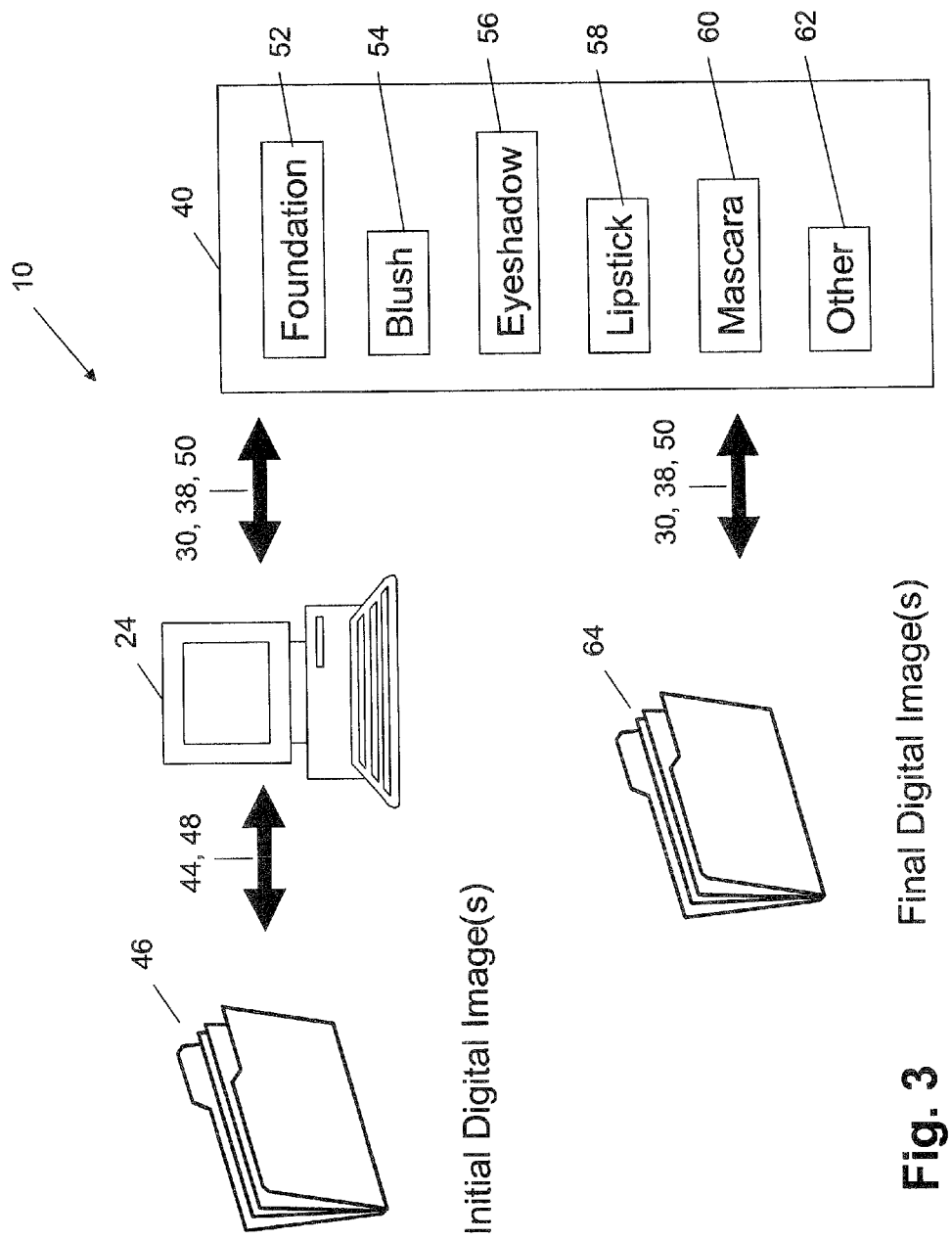
FIG. 3 is a schematic overview of a first contemplated embodiment of the system illustrated in FIG. 2, showing a contemplated data flow during operation of the present invention.

FIG. 3 provides an overview of the system 10 of the present invention from the perspective of the general flow and processing of the initial digital images 46. As illustrated, the digital images 46 are provided to the computer 24 via the communication link 48. The computer 24 interacts with the main server 40 via one or more of the communication links 30, 38, 50.

At the direction of the executable instructions from the server 40, the initial digital images 46 are modified to include one or more enhancements such as foundation 52, blush 54, eyeshadow 56, lipstick 58, mascara 60, or other 62. The "other" type of enhancements encompasses accessorial enhancements. Once enhanced, the initial digital images 46 are transformed into final digital images 64.

Figure 4:
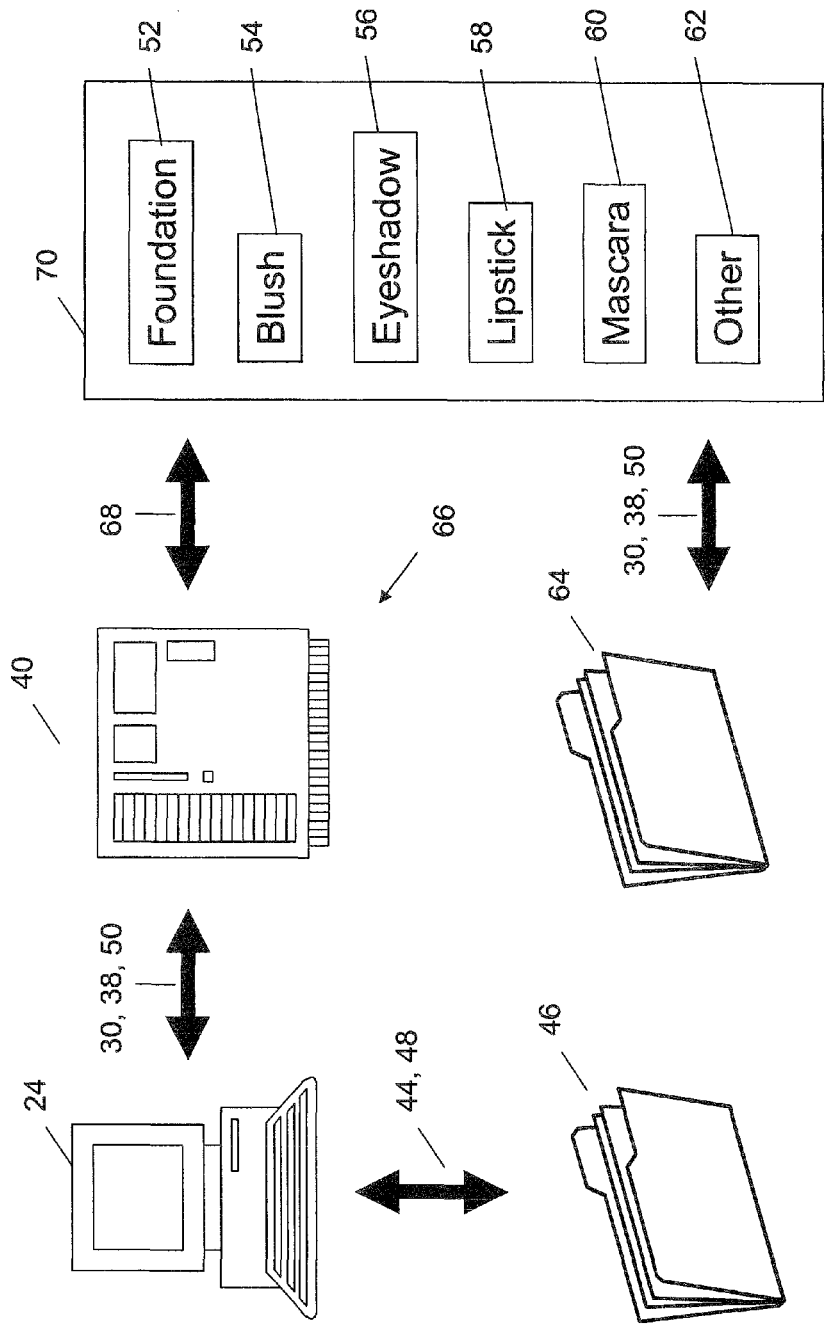
FIG. 4 is a schematic overview of a second contemplated embodiment of system illustrated in FIG. 2, showing an alternative, contemplated data flow during operation of the present invention.

FIG. 4 illustrates an overview of a system 66 in accordance with the present invention. In this embodiment, the system 66 is essentially the same as the system 10 illustrated in FIG. 3. Here, however, the server 40 communicates, via a communication link 68, with one or more associated processors 70. The processors 70 may be captive to the server 40 or may be independent from the server 40.

In the case where the processors 70 are captive to the server 40, the processors 70 may be incorporated into a single device associated with the server 40. In another contemplated arrangement, the processors 70 may be connected to the server 40 via one or more communication links 68. In this contemplated arrangement, the processors 70 may include one or more of the computers 24, 26, 28, each of which assists with the execution of at least a part of the executable instructions.

Figure 5:
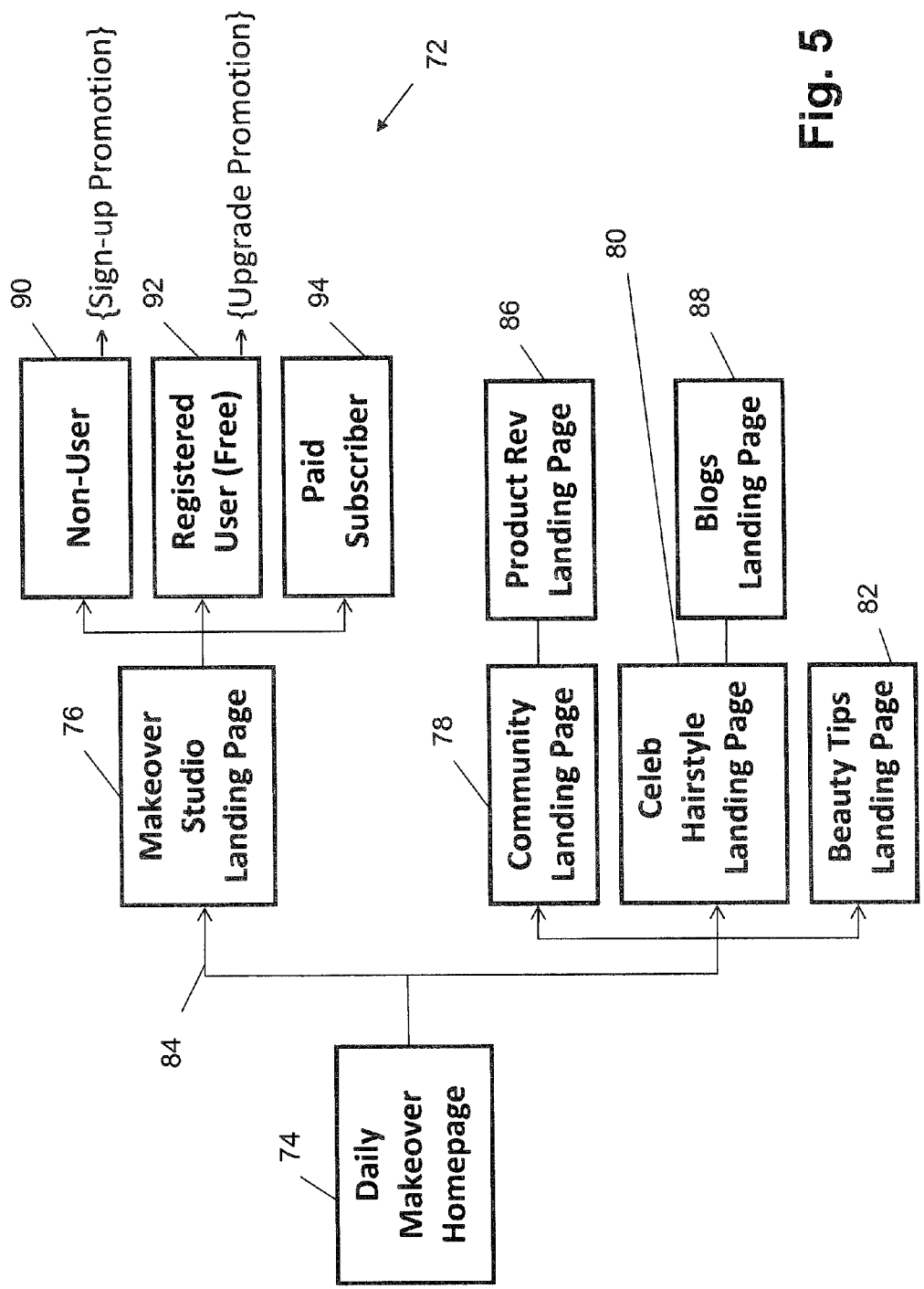
FIG. 5 is a flow chart that illustrates the general structure of a web-based product incorporating the present invention.

FIG. 5 provides a flow diagram of one arrangement of the data structure 72 contemplated for use by the present invention, specifically as may be employed in a web-based environment.

With reference to FIG. 5, the data structure 72 includes a homepage 74. The homepage 74 is intended to refer to the page accessible by a user 12 after accessing a predetermined website address, domain name, or the like.

The homepage 74 is connected to one or more landing pages 76, 78, 80, 82 via one or more communication links 84. The landing pages 76, 78, 80, 82 are representative of different content-related subcategories that may be accessible from the home page 74.

The makeover studio landing page 76 provides a gateway into the executable instructions for a virtual makeover, which is discussed in greater detail below. The community landing page 78 provides access to various aspects of the homepage that are available to the interested community. For example, the community landing page 78 may provide a portal to a product review landing page 86. The product review landing page 86 may provide access to product reviews by the host of the virtual makeover homepage 74 or by other interested parties.

The homepage 74 also is connected to a celebrity hairstyle landing page 80. The celebrity hairstyle landing page 80 provides information concerning specific cosmetic enhancements and/or accessorial enhancements, such as those employed by celebrities. The celebrity hairstyle landing page 80 provides a portal to additional pages, such as a blogs landing page 88.

The homepage 74 also may provide access to a beauty tips landing page 82. Beauty tips refer to information that may be of assistance to the user 12 with respect to cosmetic and/or accessorial enhancements, whether actual or virtual.

As should be appreciated by those skilled in the art, the homepage 74 may provide access to a limitless number of subpages, each of which are directed to specified subject matter. The number and type of pages accessible via the homepage 74 has little bearing on the scope of the present invention.

With continued reference to FIG. 5, the makeover studio landing page 76 acts as a portal to additional pages that include, but are not limited to a non-user page 90, a registered user page 92, and a paid subscriber page 94. Offers may be available through these pages. For example, the non-user page 90 may include promotional materials for the non-user to become a registered user. In addition, the registered user page 92 may include promotions to upgrade the user's status, which may make additional features available to the user. Additional upgrades and functionality also may be available to a paid subscriber via the paid subscriber page 94.

As should be apparent to those skilled in the art, the data structure 72 is only one example of a structure contemplated for use with the present invention. There are numerous other variations and equivalents that may be employed without departing from the scope of the present invention.

Figure 6:
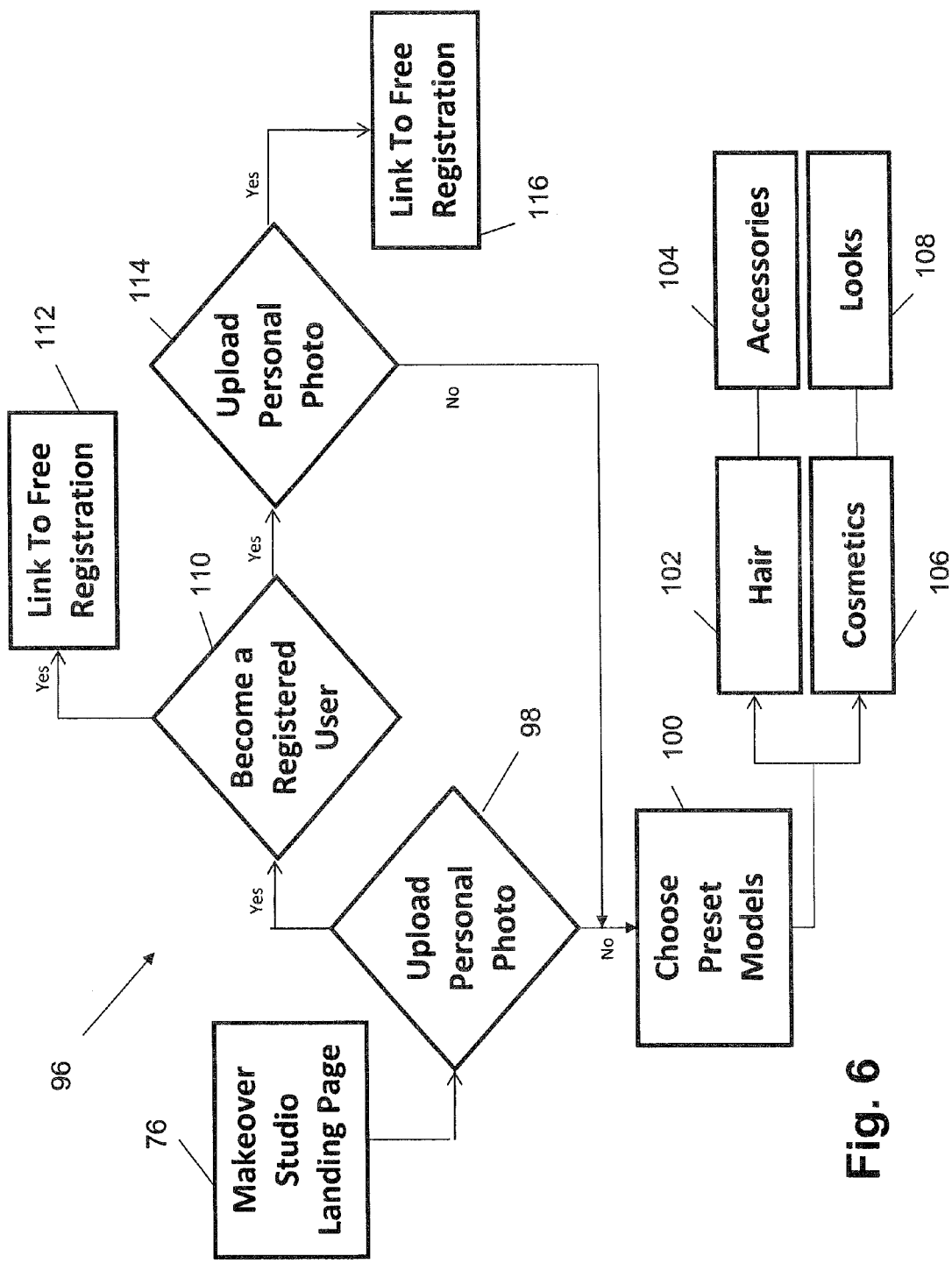
FIG. 6 is a flow chart that illustrates a first decision process contemplated for use on a web-based product incorporating the present invention.

FIG. 6 is flow chart illustrating one flow pattern 96 (i.e., a decision tree) associated with the makeover studio landing page 76. When a user 12 accesses the makeover studio landing page 76, the user 12 is asked to upload a personal photographic image (or several photographic images) at 98. If the user does not have a personal photo to upload, the user moves to the step of choosing a preset model 100. A preset model includes one of several photographs of real or virtual persons to whom a virtual makeover may be applied by the user 12. The makeover may include any one of a number of cosmetic and/or accessorial enhancements including but not limited to hair 102, accessories 104, cosmetics 106, and looks 108. A "look" may refer to a one-click makeover with a combination of enhancements such as hair 102, cosmetics 106 and accessories 104. A "look" also may refer to any other type of enhancement that may be available for a makeover, such as a change in eye color or teeth whitening, for example.

If the user 12 uploads a personal digital image at 98, the user 12 may be asked to become a registered user at 110. If the user 12 selects to become a registered user, the user 12 will be directed to a link for registration 112, which link may not entail payment of fees. Alternatively, the user 12 may be asked to pay fees, as appropriate.

After the registration step 110, the user 12 will be asked to upload a personal digital image at 114. Once the image is uploaded, registration may again be offered at 116, in addition to other options. As discussed above, if the user 12 chooses not to upload a personal digital image, the user 12 is directed to the preset models 100.

Figure 7:
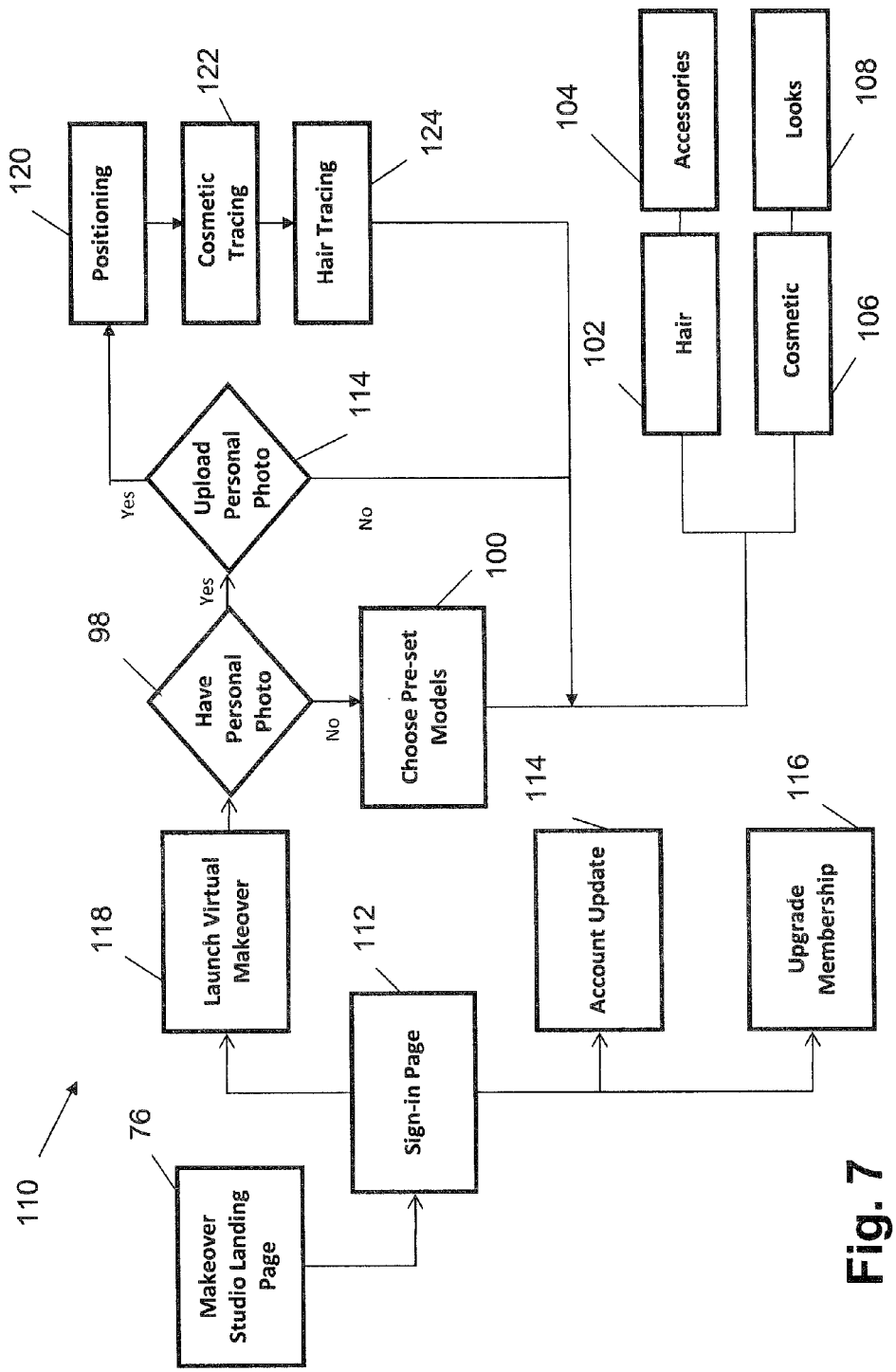
FIG. 7 is a flow chart illustrating a second decision process contemplated for use on a web-based product incorporating the present invention.

FIG. 7 is a flow chart illustrating an alternative flow pattern 110 contemplated by the present invention. The flow pattern 110 adds steps to the flow pattern 96 that is shown in FIG. 6.

With reference to FIG. 7, the user 12 accesses the make over studio landing page at 76. From this point, the user 12 may access an optional sign-in page at 112. From the sign-in page 112, the user 12 may access an account update page 114, whereby the user 12 may update information such as personal information. From the sign-in page 112, the user 12 may also access a membership upgrade page 116, which permits the user 12 to access additional functionality and/or content upon meeting certain criteria. In one contemplated embodiment, the user 12 is permitted to access enhanced capabilities and/or content upon paying a user fee, for example.

From the sign-in page 112, the user 12 also is permitted to launch the virtual makeover at 118. The upload steps 98, 114 are the same as described in FIG. 6. The preset model option 100, in addition to the hair 102, accessory 104, cosmetic 106, and looks 108 options also are the same as illustrated in FIG. 6.

FIG. 7 provides three additional steps that provide an overview to the virtual makeover of the present invention. After uploading a personal digital image at 114, the executable instructions of the present invention engage in a positioning step 120, whereby the position of the user's face and facial features (among others) are determined. After the positioning step 120, a cosmetic tracing step 122 ensues. The cosmetic tracing step 122 identifies specific facial features to which selected cosmetic effects are applied. In this step, for example, the eyelids, cheeks, lips, T-zone, etc. are identified so that the cosmetic effects may be applied thereto. Following the cosmetic tracing step 122, a hair tracing step 124 is reached. In this step, the user's hair is traced so that the user 12 may apply hairstyles from the hair library 102, for example.

Figure 8:
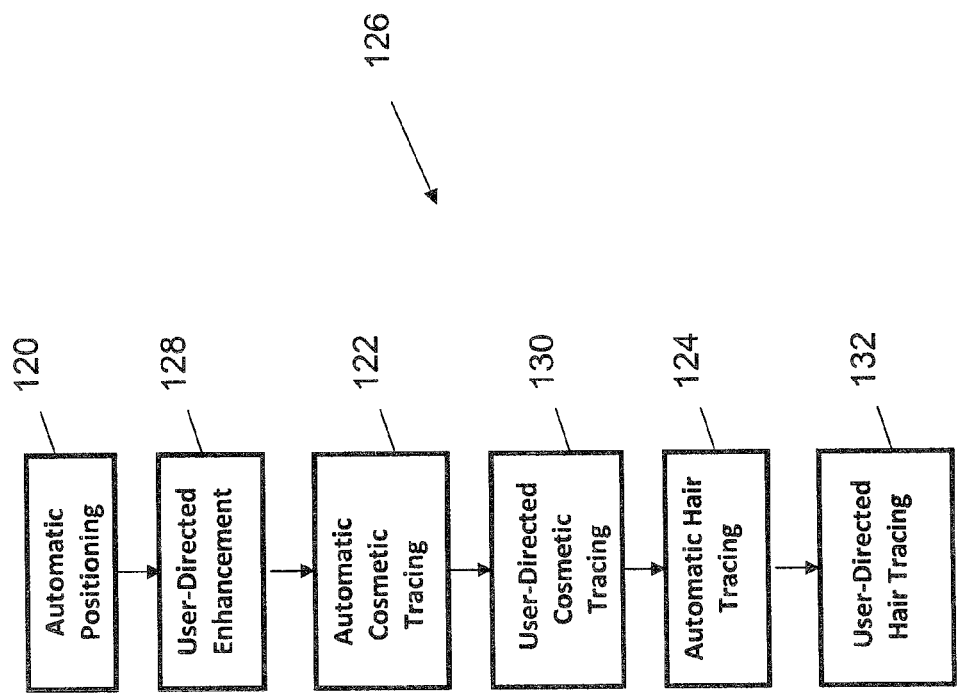
FIG. 8 is a third, partial flow chart illustrating a third decision process contemplated for use in connection with the present invention.

FIG. 8 provides a flow diagram illustrating a detailed, partial data flow segment 126 that is contemplated for incorporation into the executable instructions of the present invention. This data flow segment 126 specifically provides enhancements for the steps 120, 122, 124 that are discussed in connection with FIG. 7, above.

As illustrated in FIG. 8, the positioning step 120 is intended to be an automated step whereby the present invention locates the features of a person's face and selects the portion of the original digital image that may be used for purposes of the virtual makeover.

With respect to the automated positioning step 120, one or more face-recognition algorithms are employed. With respect to the present invention, the face-recognition algorithms analyze the pixel content in the initial digital image 46 and identifying specific landmarks that are common for human faces. In one example, the eyes are used to establish the initial landmarks in the digital image. Once the location of the eyes are identified, the face-recognition algorithms proceed to identify other landmarks, such as the eyebrows, nose, lips, cheeks, forehead, etc., by associating these features with the base landmarks (i.e., the eyes). As should be appreciated by those skilled in the art, other landmarks may be identified first and act as the focal point for the facial analysis.

The present invention does not limit the types of initial images that may be uploaded into the computer 24 for the virtual makeover. As a result, the positioning step 120 is a necessary first step for the virtual makeover. If the automated positioning step 120 fails to recognize facial features within the initial digital image 46, an error message may be generated.

There are a large number of reasons why a particular initial digital image 46 may be rejected. For example, the initial digital image 46 may have been taken from a position too far away from the user 12. If the person's face does not occupy a large enough area in the pixel map for the initial digital image 46, there may too few pixels to analyze to identify specific facial landmarks for the virtual makeover to proceed.

In another example, it is possible that the user 12 may upload an image where the user's face is partially occluded. This may occur where the person is wearing a hat or where the person's hair partially covers one or more facial features. Since face-recognition software looks for specific facial landmarks, if any of those facial landmarks are absent, the virtual makeover may not proceed. As a result, the user 12 may receive an error message, requesting that a different initial digital image 46 be uploaded.

After the automated positioning step 120 is completed, minor adjustments may be made at the user-directed enhancement step 128. In this step 128, for example, it is contemplated that the user 12 may wish to crop the image and, thereby, reduce the amount of background that is visible in the digital image, for example. This step may be helpful in those instances where the initial digital image 46 encompasses a large amount of background environment, for example.

After the user-directed enhancement step 128, the method proceeds to the automatic cosmetic tracing step 122. As discussed above, in this step, the present invention identifies specific areas in the digital image that correspond to areas on the user's face. The areas on the user's face, which are also referred to as zones, are the typical areas of interest for the application of cosmetic enhancements.

In connection with the automatic cosmetic tracing step 122, facial recognition algorithms also are employed. These may be the same algorithms as applied at step 120, for example. In this step, however, specific zones are identified based on the facial landmarks that were initially determined.

During the automated cosmetic tracing step 122, the algorithms identify or approximate specific facial areas including, but not limited to, the outline of the eyes, the eyelashes, the boundaries of the user's eyebrows, the boundaries of the user's cheeks, the boundaries of the user's T-zone, the boundary of the user's jaw line, and more. Each of these zones becomes an area that may be modified in response to user-selected enhancements.

After the automatic cosmetic tracing step 122, the user may be presented with an option to modify the tracings associated with the user's digital image 46. This occurs at the user-directed cosmetic tracing step 130. At this step 130, for example, the user 12 may wish to tweak the digital areas identified by the executable instructions that comprise the present invention.

After the user directed cosmetic tracing, the program initiates automatic hair tracing at 124. Automated hair tracing also employs face-recognition algorithms in addition to algorithms that identify transitions in the initial digital image 46 suggesting the limits of the person's hair. It is noted that these transition-sensitive algorithms cooperate in steps 120 and 122 as well.

Following the automatic hair tracing at 124, the user 12 may be permitted to provide user-directed hair tracing at 132. The user-directed hair tracing 132 permits the user to adjust the parameters determined by the program and, therefore, produce an improved result.

As should be appreciated, the user-directed steps 128, 130, 132 need not immediately follow the automated steps 120, 122, 124. To the contrary, all of the automated steps 120, 122, 124 may be completed before the user is prompted to engage in any of the user-directed steps 128, 130, 132. Other arrangements also may be employed, as should be apparent to those skilled in the art.

It is also noted that the steps 120, 122, 124 need not be executed in series or separately from one another. The algorithms that are employed may function cooperatively so that the pixels in the initial digital image 46 are analyzed collectively, within a single step. Moreover, one or more of the steps 120, 122, 124 may be combined with one another without departing from the scope of the present invention.

In connection with the flow charts discussed above, a few screen shots are now discussed to provide examples of the operation of the executable instructions that comprise the present invention. The screen shots are intended to be exemplary and not to be limiting of the invention.

Figure 9:
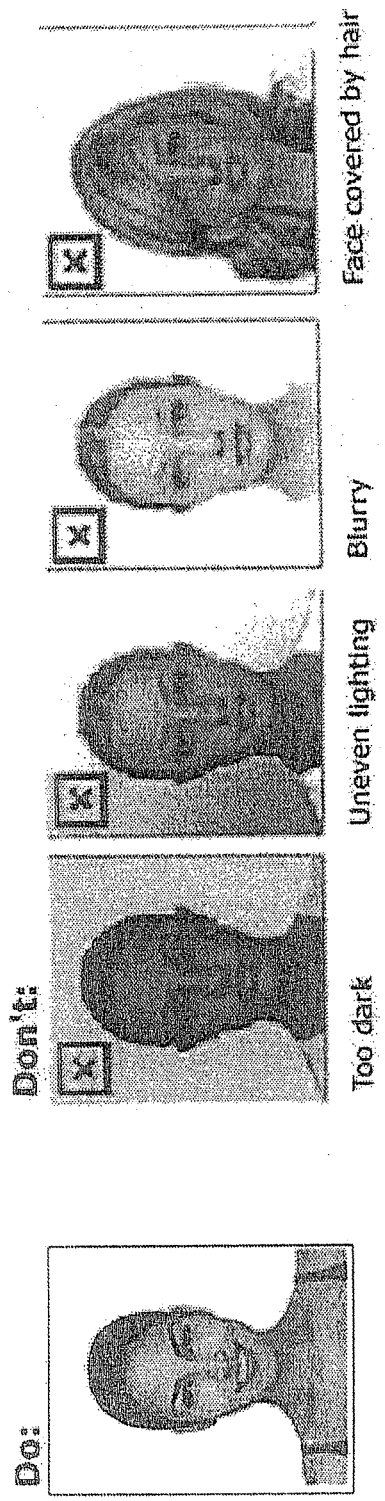
FIG. 9 is a screen shot illustrating a first aspect of the present invention concerning the uploading of a personal digital image.

FIG. 9 is a screenshot of a page that may be presented to a user at the digital image upload step 114. Information may be provided as to the type and quality of images that may be used to successfully engage in a virtual makeover. For example, the picture may not be too dark, too blurry, or include uneven lighting. In addition, photographs 46 where the user's facial features are partially occluded by hair, for example, may be excluded from this step 114.

Figure 10:
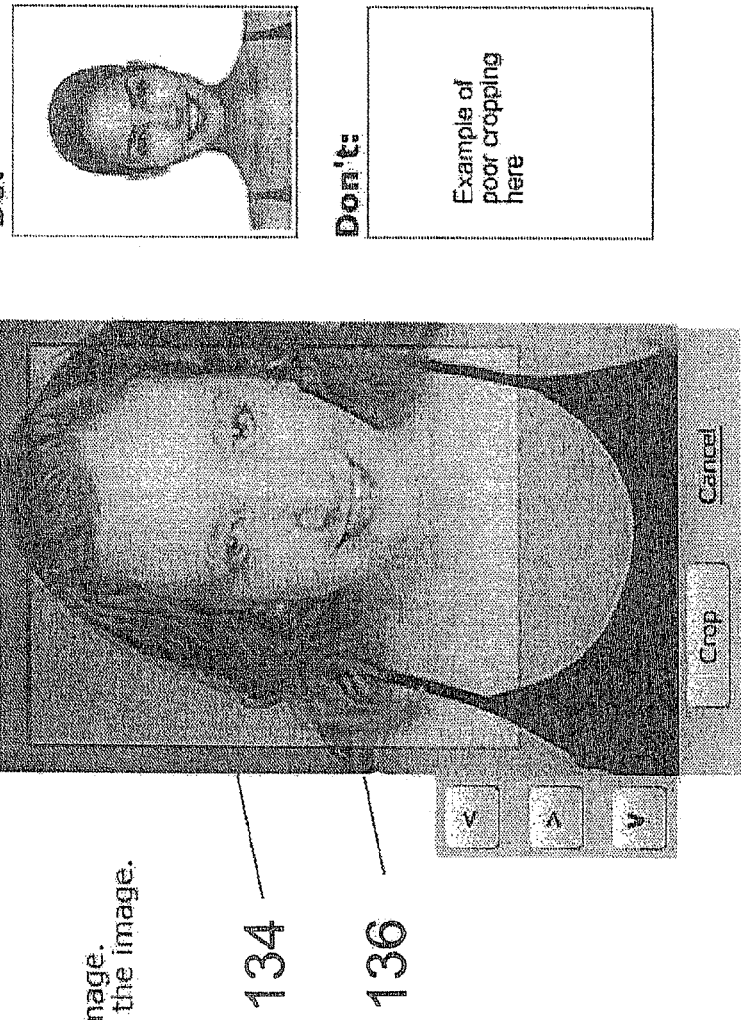
FIG. 10 is a screen shot illustrating a second aspect of the present invention concerning the application of user-defined enhancements to an uploaded personal digital image.

FIG. 10 provides one contemplated screenshot that permits a user to enhance the personal photographic image. This may be permitted in step 128, for example. As illustrated, the user may be provided with tools to crop the image from an original size 134 to a cropped size 136.

Figure 11:
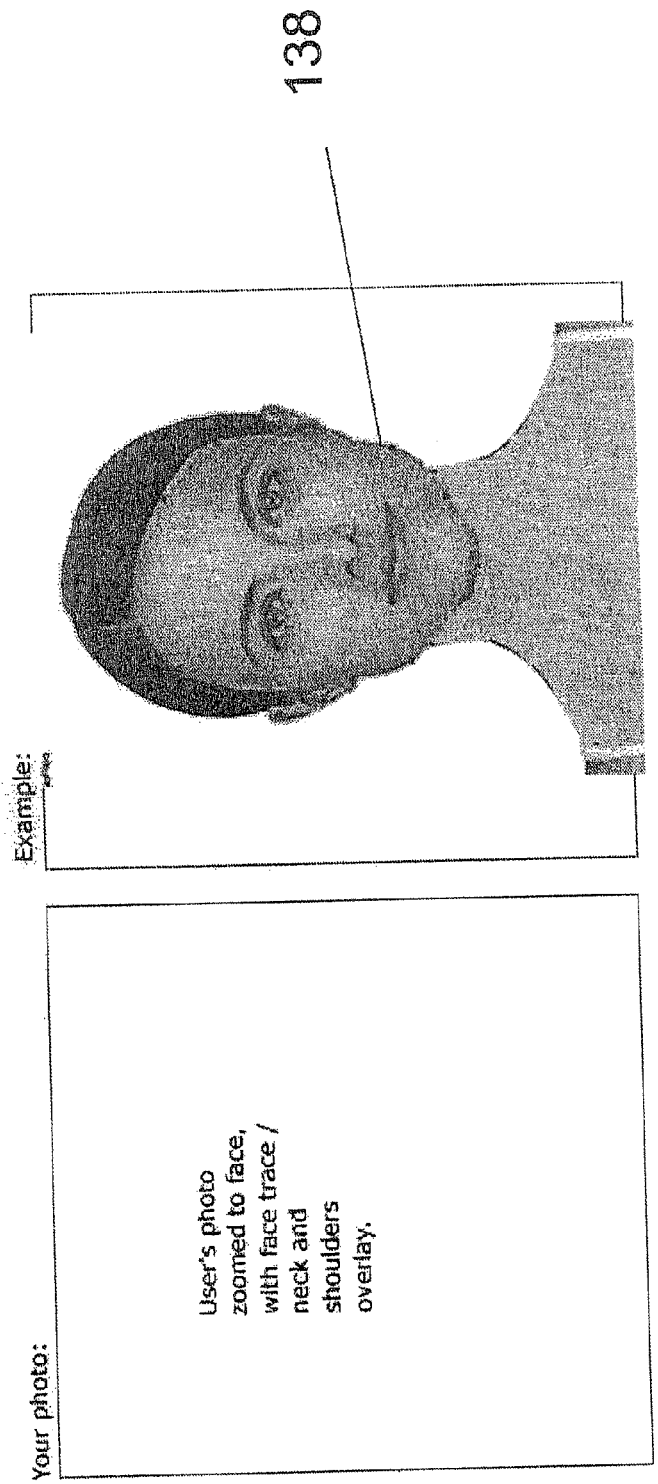
FIG. 11 is a screen shot illustrating a third aspect of the present invention with respect to user-defined cosmetic tracing of the uploaded personal digital image.

FIG. 11 is a screen shot of one contemplated aspect of the user-directed cosmetic tracing step 130. As illustrated, the user 12 may adjust the automatic tracing of the user's face to improve the accuracy and realistic look of the cosmetic enhancements to be applied to the initial digital image 46. In FIG. 10, the user's face is surrounded by a boundary 138. Using a mouse, for example, the user 12 may move the location of the boundary 138, thereby improving the operation of the present invention.

Figure 12:
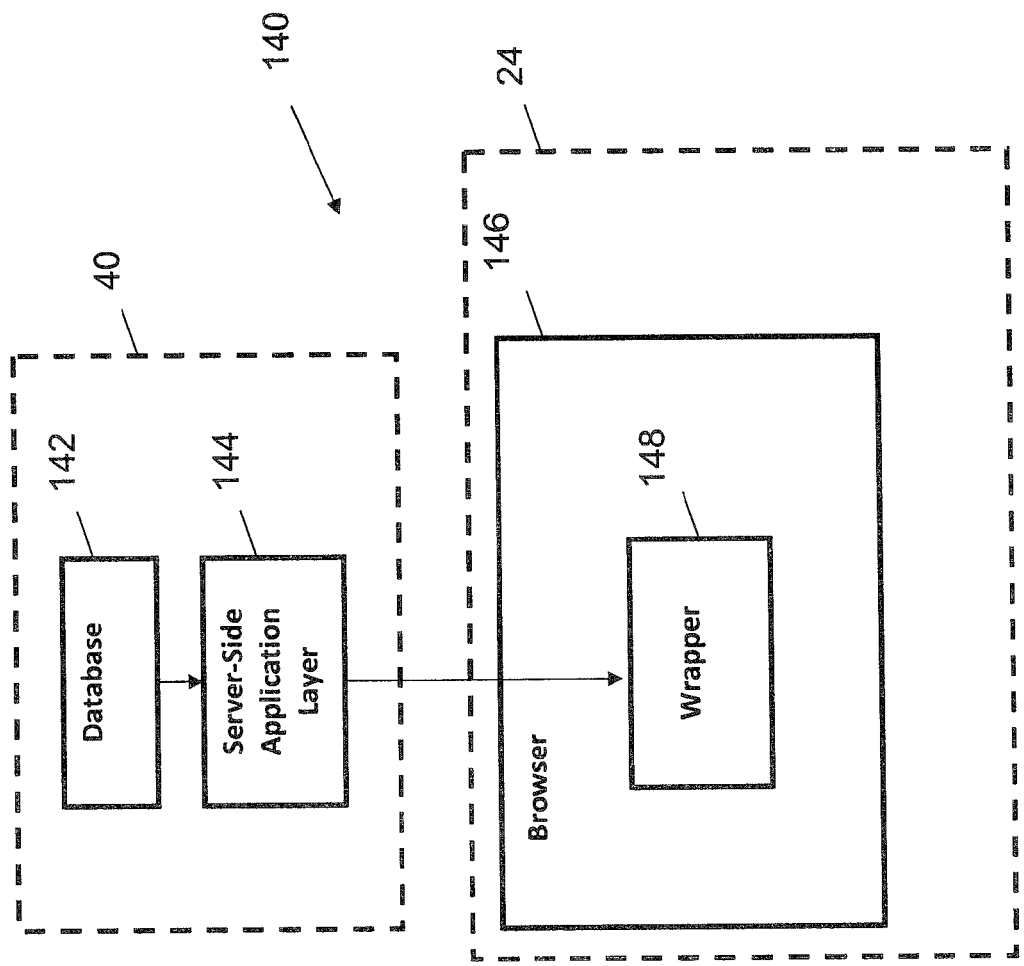
FIG. 12 is a schematic overview of the basic structure of one embodiment of the system of the present invention.

FIG. 12 provides an overview that illustrates one structure 140 contemplated for use by the present invention.

As illustrated in FIG. 12, the structure 140 includes several components, a database 142, a server-side application layer 144, a browser 146, and a wrapper 148. These aspects of the structure 140 cooperate with one another to execute the method of the present invention so that a virtual makeover may be applied to the initial digital images 46 that are inputted into the local processor 24 by an individual user 12.

The database 142 is associated with the main server 40, as should be appreciated by those skilled in the art. The database 142 includes data files that provide the executable instructions for providing the user 12 with a virtual makeover of the initial digital image 46 provided by the user 12. The database 142 also includes data files and access to data files that are needed to execute the instructions for the virtual makeover method 150, as discussed in greater detail below.

As should be appreciated by those skilled in the art, and as detailed herein, the database 142 does not need to be a single database file. Moreover, it is not required for operation of the virtual makeover method 150 that the database 142 be resident wholly on the main server 40. It is contemplated that the database 142 may be resident in memory accessible to the main server 40. Moreover, the database 142 may consist of several databases that are resident on disparate devices. As should be apparent, the exact configuration and distribution of the database 142 is not critical to operation of the present invention. To facilitate discussion of the invention, however, the database 142 will be discussed in connection with the main server 40.

The server-side application layer 144 encompasses at least the executable aspects of the virtual makeover method 150 that are resident on the main server 40. In FIG. 12, the server-side application layer 144 is shown as being entirely resident on the main server 40. The present invention is not intended to be limited solely to this arrangement. It is contemplated that the server-side application layer 144 may be resident on one or more devices that are accessible by the main server 40.

The data structure 140 also encompasses the browser 146, which is illustrated as being resident on the local processor 24. As should be appreciated by those skilled in the art, the browser 146 permits a user 12 to interact with the Internet 36 and addresses accessible therethrough. Within the browser 146, the data structure 140 includes a wrapper 148. The wrapper 148 provides the vehicle within which the virtual makeover method 150 is executed at the request of the user 12. The wrapper 148, which is described in greater detail below in connection with the virtual makeover method 150, permits the virtual makeover method 150 to be executed, at least in part, by the local processor 24.

Figure 13:
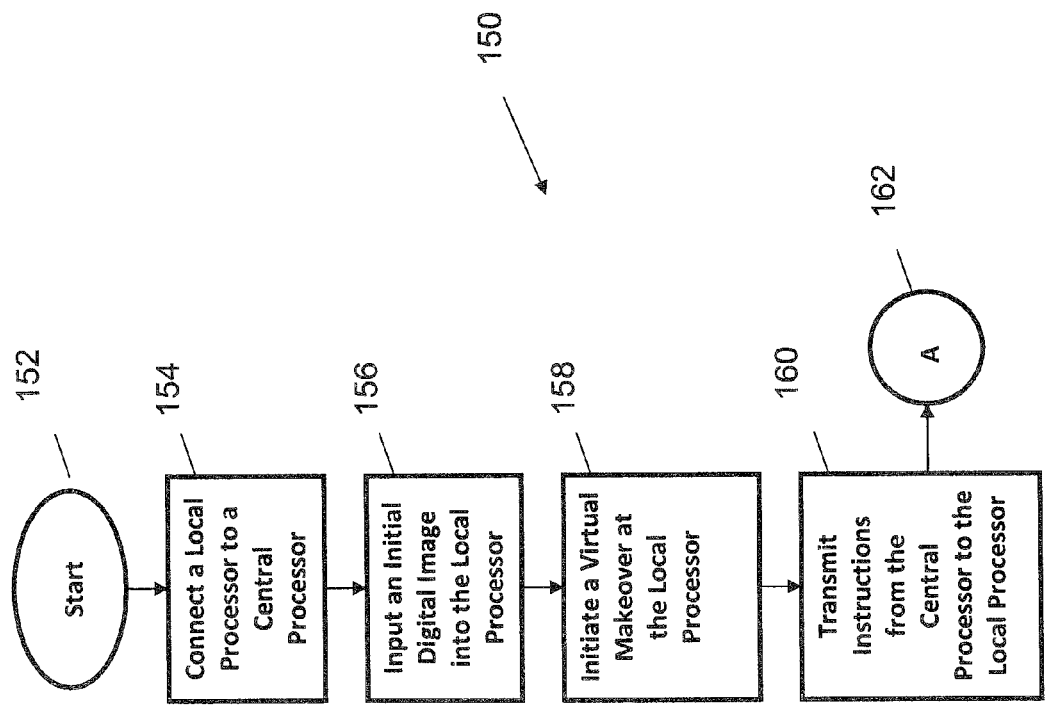
FIG. 13 is a first portion of a method contemplated by the present invention.
Figure 14:
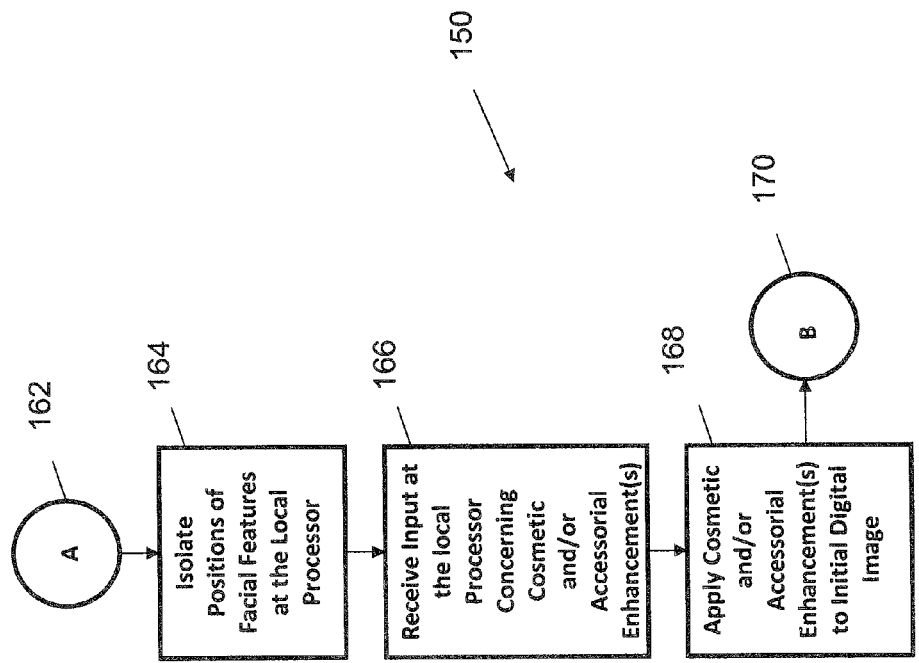
FIG. 14 is a second portion of the method contemplated by the present invention, which portion continues from the first portion illustrated in FIG. 13.
Figure 15:
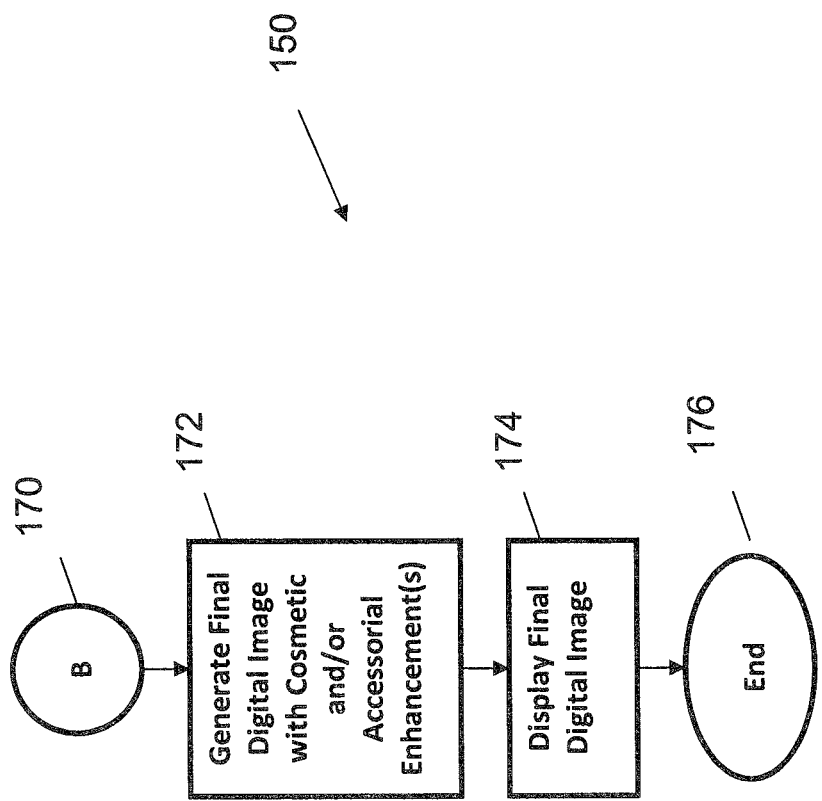
FIG. 15 is a third portion of the method contemplated by the present invention, which portion continues from the second portion illustrated in FIG. 14.

FIGS. 13-15 illustrate one virtual makeover method 150 contemplated by the present invention, which method is incorporated into an instruction set that may be executed via one or more processors.

In the discussion that follows, reference may be made to a "step" or "operation." The use of terms such as these is intended to broadly refer to the STEP and/or operation being performed. It should be understood, for purposes of discussion of the present invention, that the terms "step" and "operation" are not meant to require that the entirety of the operation and/or step be performed in order for the operation (or operations) to qualify as a "step" or "operation." To the contrary, the terms "step" and "operation" are intended to be read broadly and are used merely as a convenience for the discussion herein.

With reference to FIG. 13, the virtual makeover method 150 begins at 152.

At 154, a local processor 24 connects to a central processor, such as the main server 40. As discussed in connection with FIGS. 1 and 2, above, the local processor 24 may connect to the main server 40 via the Internet 36 or via some alternative communication link 50 independent from the Internet 36. The exact nature of the connection between the local processor 24 and the main server 40 is not critical to operation of the present invention.

At 156, the initial digital image 46 is input into the local processor 24. As may be appreciated, the initial digital image 46 may be inputted via any suitable input device. As illustrated in FIG. 2, the initial digital image 46 may be inputted directly from a camera 42. Alternatively, the initial digital image 46 may be inputted from a personal file resident on the local processor 24. As also should be appreciated by those skilled in the art, the initial digital image 46 may be provided from a large variety of input sources, including one or more memory sources.

At 158, the virtual makeover is initiated from the local processor 24. As may be apparent to those skilled in the art, the virtual makeover is expected to be initiated at the request of the user 12. Of course, the virtual makeover may be initiated upon the occurrence of one or more triggering events. For example, the virtual makeover may be initiated in response to the uploading of the initial digital image 46. Other triggering events also may be relied upon to trigger the virtual makeover, as should be appreciated by those skilled in the art.

At 160, instructions are transmitted from the main server 40 to the local processor 24. With reference to FIG. 12, the instructions that are transmitted to the local processor 24 are the instructions to be executed within the wrapper 148 that is established within the browser 146.

The instructions transmitted from the main server 40 to the local processor 24 are contemplated to be written in a non-flash format. In contrast, the wrapper 148 is anticipated to be executed in flash-based language.

As should be understood by those skilled in the art, a flash-based language refers to a language that permits animation and interactivity to web pages. A flash-based language is commonly used to create animations by manipulating vector and raster graphics and commonly includes a scripting language called "ActionScript." One flash-based language is "Adobe Flash Player" distributed by Adobe System Incorporated with a corporate headquarters address at 345 Park Avenue, San Jose, Calif., U.S.A.

In contrast, non-flash-based languages include such formats as "HTML"-based formats, more commonly known as hypertext mark-up languages. HTML-based languages are used to describe the structure of text-based information in a web page. For example, HTML-based languages denote text in a web page as a link, a heading, a paragraph, etc. HTML-based languages are not able to create animations, like flash-based languages. As a general rule, the operations of HTML-based languages and flash-based languages are antithetical to one another.

With respect to HTML-based languages, one contemplated variation encompasses CSS-based languages. CSS-based languages are more commonly referred to as "cascading style sheet" languages. CSS-based languages typically cooperate with HTML-based languages to define the format of text-based web pages. CSS typically operates to separate document content that is written in an HTML-based language. Accordingly, as should be understood by those skilled in the art, reference to HTML-based languages encompasses CSS-based languages as well.

With respect to the virtual makeover method 150 of the present invention, the instructions transmitted to the local processor 24, at step 160, are intended to be written in an HTML-based language. The wrapper 148, however, is contemplated to be written in a flash-based language for generation of graphics.

With respect to the virtual makeover presentation, it is in HTML format. As the flash is loaded into the browser, it consumes the HTML in a similar fashion as an XML would be consumed in normal flash-data integration. The content contains both data and presentation information, which tell the flash ActionScript how to display images, content, and control panels. The CSS within the HTML enables the page styling and formatting.

As illustrated in FIG. 13, the virtual makeover method 150 transitions to FIG. 14 at the transition node "A" 162.

At 164, portions of the facial features with the initial digital image 46 are isolated. This operation occurs at the local processor 24.

Step 164 is executed at the local processor 24 for several reasons. Among them, it is desirable to minimize the active central processor unit ("CPU") time within the main server to accommodate as many users 12, 14, 16 as possible who access the makeover webpage 74. By tasking the local processor 24 with executing instructions for isolating the positions of facial features within the initial digital image 46, the main server 40 is not excessively encumbered.

It is contemplated that the positions of the facial features are isolated via algorithms that are known to those skilled in the art. This may include the use of facial recognition algorithms, among others. The exact details of the operation of step 164 are not critical to operation of the virtual makeover method 150 of the present invention.

As a result of the operation at 164, it is contemplated that several facial areas will be identified. These areas include, but are not limited to: the forehead, the eyebrows, the eyes, the nose, the lips, the mouth, the chin, the ears, the cheeks, the jaw line, the T-zone, the hair, etc.

At 166, input is received from the user 12, through the local processor 24, concerning selected ones of the cosmetic enhancements and/or accessorial enhancements that the user 12 would like to apply to the initial digital image 46. There are several cosmetic enhancements that are intended to be accessible to the user 12. For example, as detailed in FIG. 3, the user 12 may apply a foundation effect, a blush effect, an eyeshadow effect, a lipstick effect, and a mascara effect, among many others. As for accessorial enhancements, these include, but are not limited to, the application of jewelry, such as earrings and necklaces, and the application of non-jewelry items, such as hats, glasses, sunglasses, and contact lenses, to the initial digital image 46.

At 168, in response to the input from the user 12, the selected cosmetic and/or accessorial enhancements are applied to the initial digital image 46. As should be appreciated, the cosmetic and/or accessorial enhancements are coded to be applied to the initial digital image in connection with the facial features isolated in step 164. For example, if the user selects the application of a particular shade of lipstick, the lipstick is applied to the lips region of the initial digital image, as isolated in step 164. Any number of enhancements may be applied to an initial digital image 46, as should be appreciated by those skilled in the art.

Concerning the calculation and application of the enhancements, there are several methodologies that may be employed. It is contemplated that the enhancements may be applied by calculating final pixel values from the initial pixel values based on the selected cosmetic enhancement. Alternatively, it is contemplated that the present invention may access one or more overlays based on the selected enhancement and apply those overlays to the initial digital image 46, thereby creating the final digital image 64. In still a further contemplated embodiment, a combination of overlays and calculations may be employed.

Reference is now made to the application of lipstick as a cosmetic enhancement to an initial digital image 46 to create the final digital image 64. This example is intended to be applicable to any of the cosmetic enhancements listed herein.

For the calculated approach to enhancements, when the user 12 selects a particular shade of lipstick to be applied to the initial digital image 46, at 168, the initial pixels associated for the lip zone are isolated. Then, from a database such as the database 142, aspects of the selected lipstick are retrieved. The aspects are processed via one or more algorithms to modify the original pixels and produce final pixels for the final digital image 64. The final pixels are then inserted into the original digital image 46 to product the final digital image 64.

For the overlay approach, when the user 12 selects the lipstick to be applied to the initial digital image 46, at 168, the method 150 retrieves an overlay pixel map from a database such as database 142. The overlay pixel map is them altered to match the parameters of the user's lips and is inserted into the initial digital image 46 to create the final digital image 64.

As noted, the method 150 also may employ a hybrid approach for a particular cosmetic enhancement by relying on information from a database, such as database 142, and also relying on algorithms to create the final digital image 64. As should be apparent, at 168, specific visual effects are added, such as shimmer, gloss, matte, etc. to improve the appearance of the cosmetic enhancement.

It is noted that accessorial enhancements are more likely to rely on the overlay approach than cosmetic enhancements. If the user 12 selects a particular pair of sunglasses, for example, the method retrieves a pixel map for the pair of sunglasses from a database, such as the database 142. The pixel map is then adjusted to be sized appropriately for the user's image and is applied to the initial digital image 46 to generate the final digital image 64.

As noted in FIG. 14, the virtual makeover method transitions to FIG. 15 at transition node "B" 170.

Referring to FIG. 14, at 172, the method 150 proceeds to generate the final digital image 64 incorporating the cosmetic and/or accessorial enhancements selected by the user 12.

At 174, the final digital image 64 is displayed to the user 12. It is contemplated that the display will be via the monitor associated with the local processor 24. Of course, the final digital image 64 may be displayed via other means, i.e., by being printed onto paper, for example.

The method 150 ends at 176, as illustrated in FIG. 15.

With reference to the application of selected cosmetic and/or accessorial enhancements to the initial digital image at step 168, there are a wide variety of enhancements that are possible, as discussed above.

With respect to cosmetics, the user 12 may apply a foundation enhancement 52, a blush enhancement 54, and eyeshadow enhancement 56, a lipstick enhancement 58, and a mascara enhancement 60, among others. For each enhancement, the database 142 is consulted by the algorithms embedded in the virtual makeover method 150 and system 10. The database 142 provides necessary information so that the enhancement may be applied to the initial digital image 46. Aspects of each of these enhancements will now be discussed to provide a general overview of this aspect of the present invention.

Regardless of the specific cosmetic enhancement selected by a user, it is contemplated that the user's menu of choices will be dictated by parameters associated with actual products available commercially. As a result, the user 12 will have the ability to virtually test products that may be tested actually at a particular in-person point of sale.

The foundation enhancement 52 concerns the application of a visual representation of foundation makeup to the initial digital image 46. Foundation makeup is essentially a base layer of makeup that is applied generally to a person's face. Taking into account the skin tone of the user 12, as identified from the initial digital image, and taking into account the foundation selected by the user 12, the program determines how the selected foundation will appear on the initial digital image 46 and provides a final digital image 64 incorporating the determined changes.

As noted above, the virtual makeover method 150 of the present invention may rely on either an algorithmic approach for the application of cosmetic enhancements to the initial digital image 46. Alternatively, the virtual makeover method 150 may rely on a look-up table-based approach. Alternatively still, the virtual makeover method 150 may rely on a combination of algorithms and look-up tables to apply the cosmetic enhancement to the initial digital image 46, thereby producing the final digital image 64.

The blush enhancement 54 involves the application of a color selected by the user to the cheek areas in the initial digital image 46. With respect to this enhancement, as well as others discussed, the program may incorporate specific transparency models to the blush enhancement 54. The transparency adjustments may be a function of the product itself or a function of parameters selected by the user 12. For example, it is contemplated a selected blush may be more transparent than comparable products made by other manufacturers. If so, the virtual makeover method 150 will apply the cosmetic enhancement taking this information into account. As with the foundation enhancement 52, the blush enhancement 54 may be applied via an algorithmic approach, a look-up table approach, or a combination of the two.

As should be apparent, the eyeshadow enhancement 56 concerns the application of one or more eyeshadow products to the eyelids of the user, as isolated from the initial digital image 46.

The lipstick enhancement 58 concerns the application of a lipstick color to the user's lips, as identified from the initial digital image 46.

The mascara enhancement 60 concerns the application of effects to the user's eye area, again as identified from the initial digital image 46.

With respect to these cosmetic enhancements, there are several parameters that may be taken into account. The first is the transparency of the cosmetic effect. As noted above, the transparency of a particular cosmetic effect may be affected by parameters of the product itself or parameters inputted by the user 12. The second is a value known as "shimmer," which concerns the concentration of light-reflective materials incorporated into a particular cosmetic. As with transparency, this effect is dependent on actual product parameters as well as user-identified preferences. Gloss is a third parameter that may be associated with a particular cosmetic effect. "Gloss" refers to the shininess of the cosmetic effect. A fourth parameter that may be taken into account is a value known as "matte," which concerns the products lack of affinity to reflect light impingent thereon. Each of these factors, in addition to others, may be encompassed by one or more of the cosmetic enhancements addressed by the virtual makeover method 150 and system 10 of the present invention.

The accessorial enhancements include, but are not limited to, the application of jewelry such as earrings and necklaces. The accessorial enhancements also encompass non-jewelry items such as hats, glasses, sunglasses, colored contact lenses, hair clips, etc.

Accessorial enhancements also are contemplated to be based on products currently offered for sale. Based on the isolation of facial features at 164 and user-selected inputs, the virtual makeover method 150 determines what accessorial enhancements to apply and where they are to be applied.

Colored contact lenses are those lenses available to the public so that a user 12 may change his or her eye color. In view of the isolation of facial features at 164, which includes the isolation of the person's irises, the color of the person's eyes may be virtually altered as an accessorial enhancement.

Teeth whitening also may be applied in circumstances where the initial digital image 46 includes a toothy grin. The extent of the virtual tooth whitening may be applied based on product and user-specified parameters, just as with the cosmetic enhancements.

Other cosmetic and accessorial enhancements also are contemplated to fall within the scope of the present invention.

As noted above, the present invention is not intended to be limited to the specific embodiments described herein. The embodiments are intended to illustrate the broad scope of the present invention.

What is claimed is:

1. A method for a creating a virtual makeover, executable by one or more processors, comprising:
   connecting a local processor to a main server;
   inputting an initial digital image into the local processor;
   initiating the virtual makeover at the local processor;
   transmitting instructions from the main server to the local processor in response to initiation of the virtual makeover;
   isolating positions of facial features within the digital image at the local processor;
   defining facial regions within the digital image based on the positions of the facial features at the local processor;
   receiving input at the local processor concerning selected ones of cosmetic enhancements or accessorial enhancements to be applied to the initial digital image;
   applying the cosmetic enhancements or the accessorial enhancement to the digital image at the local processor;

generating a final digital image comprising the initial digital image as enhanced by application of the cosmetic enhancements or the accessorial enhancements; and
displaying the final digital image,
wherein at least one of the defining, applying, and generating steps comprise instructions written in a non-flash format for execution in a flash-based wrapper.

2. The method of claim 1, wherein all of the defining, applying, and generating steps comprise instructions written in a non-flash format for execution in a flash-based wrapper.

3. The method of claim 1, wherein the non-flash format comprises at least Hyper Text Markup Language based code.

4. The method of claim 3, wherein the non-flash format comprises at least Hyper text Markup Language based and Cascading Style Sheet based code.

5. The method of claim 1, wherein the flash-based wrapper is executed within an Internet browser.

6. The method of claim 1, wherein the local processor and the main server are connected via the Internet.

7. The method of claim 1, further comprising:
isolating positions of hair features within the digital image at the local processor.

8. The method of claim 1, further comprising:
receiving input to adjust the facial features isolated within the digital image.

9. The method of claim 7, further comprising:
receiving input to adjust the hair features isolated within the digital image.

10. The method of claim 1, wherein the cosmetic enhancements comprise at least one of foundation, blush, eyeshadow, lipstick, and mascara.

11. The method of claim 10, wherein the cosmetic enhancements comprise at least one of transparency, shimmer, gloss, and matte.

12. The method of claim 1, wherein the accessorial enhancements comprise at least one of earrings, necklaces, tiaras, hats, glasses, sunglasses, contact lenses, hair clips, barrettes, flowers, clips, veils, and jewelry.

13. The method of claim 1, wherein at least one of the isolating, defining, applying, and generating steps are performed at the local processor and at the main server.

14. The method of claim 1, wherein the local processor comprises a plurality of local processors.

15. The method of claim 1, wherein the main server comprises at least one database and at least one server-side application.

16. The method of claim 1, wherein the local processor comprises at least a browser and a wrapper.

* * * * *